No. 657,078. Patented Sept. 4, 1900.

B. C. BATCHELLER.

PACKING DEVICE FOR ANNULAR JOINTS.

(Application filed Oct. 1, 1898.)

(No Model.) 2 Sheets—Sheet 1.

Witnesses:
Henry Drury
[signature]

Inventor:
Brinley C. Batcheller
by his atty.
Francis T. Chambers

THE NORRIS PETERS CO., PHOTO-LITHO., WASHINGTON, D. C.

No. 657,078.

Patented Sept. 4, 1900.

B. C. BATCHELLER.

PACKING DEVICE FOR ANNULAR JOINTS.

(Application filed Oct. 1, 1898.)

(No Model.)

2 Sheets—Sheet 2.

Witnesses:

Henry Drury

[signature]

Inventor:

Birney C. Batcheller by his atty.

Francis T. Chambers

THE NORRIS PETERS CO., PHOTO-LITHO., WASHINGTON, D. C.

UNITED STATES PATENT OFFICE.

BIRNEY C. BATCHELLER, OF PHILADELPHIA, PENNSYLVANIA.

PACKING DEVICE FOR ANNULAR JOINTS.

SPECIFICATION forming part of Letters Patent No. 657,078, dated September 4, 1900.

Application filed October 1, 1898. Serial No. 692,381. (No model.)

*To all whom it may concern:*

Be it known that I, BIRNEY C. BATCHELLER, a citizen of the United States of America, residing in the city and county of Philadelphia, in the State of Pennsylvania, have invented a certain new and useful Improvement in Packing Devices for Annular Joints, of which the following is a true and exact description, reference being had to the accompanying drawings, which form a part thereof.

My invention relates to the provision of a packing device arranged to work between two relatively-movable surfaces, between which an annular joint is formed, and is especially, though not exclusively, designed for such joints as are formed between senders or receivers of pneumatic transmission-tubes and the parts in connection with which such senders or receivers work.

The object of my invention is to provide a joint which will offer the minimum of resistance to the motion of the one surface relatively to the other, while efficiently preventing the escape of air or other gas through the joint.

The nature of my invention will be best understood as described in connection with the drawings, in which it is illustrated, and in which—

Figures 1, 2, 3:
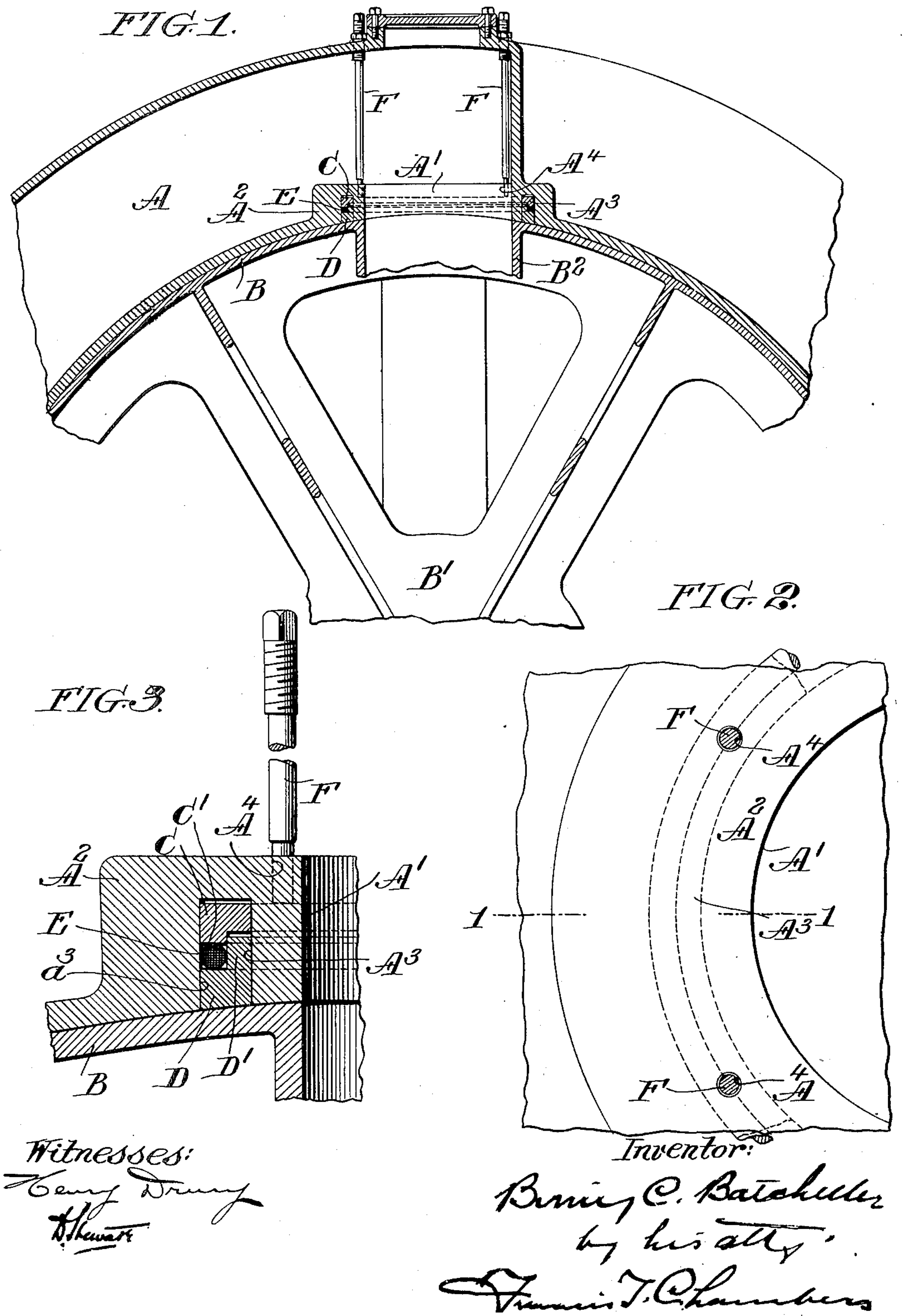

Figure 1 is a sectional elevation showing my joint as applied to a receiving and transmitting apparatus such as is described in my Patent No. 595,755, of December 21, 1897. Fig. 2 is a fragmentary plan view, on a larger scale, of the stationary joint member as shown in Fig. 1. Fig. 3 is a cross-section on line 1 1 of Fig. 2, the section being the same as that of Fig. 1; and Fig. 4 is a sectional elevation of a tumbling barrel or cylinder, showing my invention as applied to it.

Figure 4:
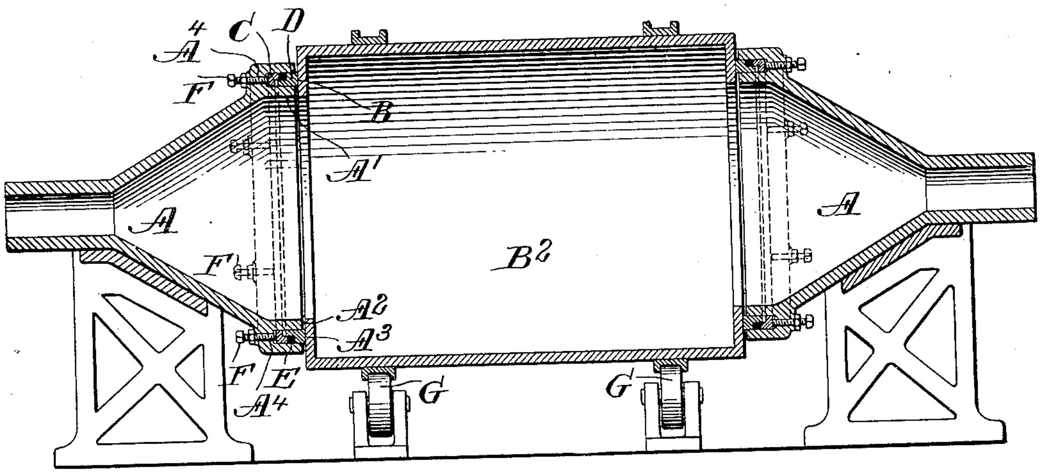

A, Figs. 1 and 4, indicates the conduit through which air or other fluid is passing and between which and a relatively-movable part a joint is formed, A′ indicating the opening in the conduit, around which said joint extends.

B is the movable device, of whatever nature, into or against which the opening leads. In Fig. 1 it is a face-plate of the rotating receiver-frames B′, $B^2$ indicating the receiver-tube, and in Fig. 4 it is the annular end plate of the cylinder $B^2$.

In the conduit or on a hub $A^2$, formed on it about the opening A′, I form an annular chamber $A^3$, opening outward against the movable surface B and having its walls preferably perpendicular to said surface. In this chamber I fit an annular ring D, said ring moving freely in the chamber and having a face which fits against the surface B, forming a tight joint with it when pressed outward, as it is by some resilient device. As, however, fluid would naturally escape through chamber $A^3$ around ring D, I provide a packing between the outer side of the ring and the outer side $a^3$ of the chamber, so preventing any appreciable loss of fluid at the joint. To this end I form the ring D with an inner shoulder D′ at its upper end or rear and place upon it and around said flange a gasket E, of elastic and compressible material, providing a second ring C, which fits in chamber $A^3$ above ring D and is forced against gasket E, as by the adjustable screws F F, &c., passing through threaded holes $A^4$ in the hub $A^2$, and for the best results I provide an outer annular flange C′ on ring C, which projects beyond the end of flange D′ before resting against the gasket E. It is obvious, of course, that the gasket under pressure will make a tight joint with shoulder D′ and wall $a^3$ and effectually prevent the escape of fluid through chamber $A^3$.

Having now described my invention, what I claim as new, and desire to secure by Letters Patent, is—

1. A packing device for annular joints between relatively-movable surfaces consisting of an annular chamber, as $A^3$, formed in one surface to face the other, a joint-ring, as D, fitting loosely in said chamber, and adapted to fit against the opposite surface, said ring having an annular inner shoulder D′, a second annular ring C adapted to fit in chamber $A^3$ above ring D, a packing-ring E adapted to rest on the upper end of ring D and surround shoulder D′ and means for pressing ring C downward to cause it to press against ring E and force said ring into close contact with the head and flange of ring D and with the wall $a^3$ of chamber $A^3$.

2. A packing device for annular joints between relatively-movable surfaces consisting of an annular chamber, as $A^3$, formed in one surface to face the other, a joint-ring, as D, fitting loosely in said chamber and adapted to fit against the opposite surface, said ring having an annular inner shoulder D′, a second annular ring C adapted to fit in chamber $A^3$ above ring D and having an outer annular shoulder C′, a packing-ring E adapted to rest on the upper end of ring D and surround shoulder D′ and means for pressing ring C downward to cause its flange C′ to press against ring E and force said ring into close contact with the head and flange of ring D and with the wall $a^3$ of chamber $A^3$.

BIRNEY C. BATCHELLER.

Witnesses:
CHAS. F. MYERS,
D. STEWART.